(12) United States Patent
Tisue et al.

(10) Patent No.: US 11,203,387 B2
(45) Date of Patent: Dec. 21, 2021

(54) BICYCLE SEAT POST ISOLATOR

(71) Applicants: Kevin Tisue, Park City, UT (US); Chris Cocalis, Phoenix, AZ (US); Bill Kibler, Maricopa, AZ (US); Zachary Griendling, Phoenix, AZ (US)

(72) Inventors: Kevin Tisue, Park City, UT (US); Chris Cocalis, Phoenix, AZ (US); Bill Kibler, Maricopa, AZ (US); Zachary Griendling, Phoenix, AZ (US)

( * ) Notice: Subject to any disclaimer, the term of this patent is extended or adjusted under 35 U.S.C. 154(b) by 325 days.

(21) Appl. No.: 16/423,003

(22) Filed: May 25, 2019

(65) Prior Publication Data
US 2020/0369337 A1    Nov. 26, 2020

(51) Int. Cl.
*B62J 1/02* (2006.01)
*B62K 19/36* (2006.01)

(52) U.S. Cl.
CPC .................. *B62J 1/02* (2013.01); *B62K 19/36* (2013.01); *B62K 2201/02* (2013.01)

(58) Field of Classification Search
CPC ......... B62J 1/00; B62J 1/02; B62J 1/08; B62J 2001/085; B62K 19/36
See application file for complete search history.

(56) References Cited

U.S. PATENT DOCUMENTS

| | | | |
|---|---|---|---|
| 5,382,039 A | 1/1995 | Hawker | |
| 5,657,958 A | 8/1997 | McLaughlin | |
| 6,032,934 A * | 3/2000 | Wu | B62J 1/06 267/132 |
| 7,125,030 B2 | 10/2006 | D'Aluisio | |
| 8,888,115 B2 | 11/2014 | Chubbuck | |
| 9,828,054 B2 | 11/2017 | D'Aluisio | |
| 2002/0113403 A1 * | 8/2002 | Chen | B62K 19/36 280/288.4 |
| 2011/0254246 A1 | 10/2011 | Pryde | |
| 2015/0321719 A1 | 11/2015 | Schmidt | |

* cited by examiner

*Primary Examiner* — Minnah L Seoh
*Assistant Examiner* — Michael R Stabley
(74) *Attorney, Agent, or Firm* — Parsons & Goltry; Robert Parsons; Michael Goltry (57) ABSTRACT

A bicycle seat post isolator assembly constructed to be fixedly engaged in a seat post receiving opening in a bicycle frame. A seat post gripper includes an elongated inner tubular body with an outer elastomeric layer/covering, inserted into the opening to receive a seat post coaxially therein. The layer/covering is positioned between the body and the bicycle frame. A retaining structure designed to be fixed adjacent an edge of the seat post receiving opening with a portion extending into the opening to only engage portions of the outer elastomeric layer/covering of the seat post gripper so as to lock the seat post gripper in the seat post receiving opening, whereby the layer/covering of the gripper is positioned between the body of the gripper with the seat post inserted coaxially into the gripper and the bicycle frame.

19 Claims, 8 Drawing Sheets

BICYCLE SEAT POST ISOLATOR

FIELD OF THE INVENTION

This invention relates to bicycle seat posts and more specifically to an isolating system that isolates the seat post from the frame.

BACKGROUND OF THE INVENTION

It is well known in the art that bicycles normally include a seat that is affixed to one end of a seat post. The seat post is normally rigidly clamped into an elongated opening in the bicycle frame. The problem with this arrangement is that bumps and rough areas encountered while riding the bicycle are transmitted directly to the rider. This jarring of the rider can become extremely uncomfortable, especially for long trips/rides or over rough terrain.

Several attempts to solve this problem have been proposed in the form of damping elements or elastomers distributed between the seat post and the frame. The major problem with all of these proposed arrangements is that some connection between the seat post and frame is always included to hold the assembly in place. This connection invariably transmits at least some of the jarring to the seat and, hence, to the rider.

It would be highly advantageous, therefore, to remedy this and other deficiencies inherent in the prior art.

Accordingly, it is an object of the present invention to provide a new and improved bicycle seat post isolator.

It is another object of the present invention to provide a new and improved bicycle seat post isolator that completely isolates the seat post (and attached seat) from the bicycle frame.

It is another object of the present invention to provide a new and improved bicycle seat post isolator that is relatively simple to manufacture and install.

SUMMARY OF THE INVENTION

Briefly, to achieve the desired objects of the instant invention in accordance with a preferred embodiment thereof, a bicycle seat post isolator assembly is constructed to be fixedly engaged in a seat post receiving opening in a bicycle frame. A seat post gripper includes an elongated inner tubular body with an outer elastomeric layer/covering, inserted into the opening to receive a seat post coaxially therein. The layer/covering is positioned between the body and the bicycle frame. A retaining structure is designed to be fixed over an edge of the seat post receiving opening to only engage portions of the outer elastomeric layer/covering of the seat post gripper so as to lock the seat post gripper in the seat post receiving opening, whereby the layer/covering of the gripper is positioned between the body of the gripper with the seat post inserted coaxially into the gripper and the bicycle frame.

The desired objects of the instant invention are further achieved in accordance with a specific embodiment of a bicycle frame with seat post isolator assembly including a bicycle frame with a seat post receiving opening and a seat post. A frame cap is designed to be fixed over an edge of the seat post receiving opening. A seat post gripper includes an elongated inner tubular body with an outer elastomeric layer/covering. The seat post gripper is designed to be inserted into the seat post receiving opening and to receive the seat post coaxially therein, an upper portion of the inner tubular body extends outwardly from the seat post receiving opening. The outer elastomeric layer/covering is positioned between the inner tubular body and the bicycle frame. A locking ring is constructed to be engaged with the frame cap and to engage only portions of the outer elastomeric layer/covering of the seat post gripper so as to lock the seat post gripper in the seat post receiving opening. A clamp is positioned to fix the upper portion of the inner tubular body to the seat post inserted coaxially into the seat post gripper, whereby the outer elastomeric layer/covering of the seat post gripper is positioned between the inner tubular body of the seat post gripper with the seat post inserted coaxially into the seat post gripper and the bicycle frame.

The desired objects of the instant invention are further achieved in accordance with a specific embodiment of a bicycle frame with seat post isolator assembly attached. The embodiment includes a bicycle frame with a seat post receiving opening, a seat post, a frame cap designed to be fixed over an edge of the seat post receiving opening, a seat post gripper, a locking ring, and a clamp. The seat post gripper including an elongated inner tubular body with an outer elastomeric layer/covering, an upper portion of the inner tubular body extending outwardly from the seat post receiving opening, the outer elastomeric layer/covering being positioned between the inner tubular body and the bicycle frame. The seat post gripper designed to be inserted into the seat post receiving opening and to receive the seat post coaxially therein. The locking ring constructed to be engaged with the frame cap and to engage only portions of the outer elastomeric layer/covering of the seat post gripper so as to lock the seat post gripper in the seat post receiving opening. The clamp is positioned to fix the upper portion of the inner tubular body to the seat post inserted coaxially into the seat post gripper, whereby the outer elastomeric layer/covering of the seat post gripper is positioned between the inner tubular body of the seat post gripper with the seat post inserted coaxially into the seat post gripper and the bicycle frame.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
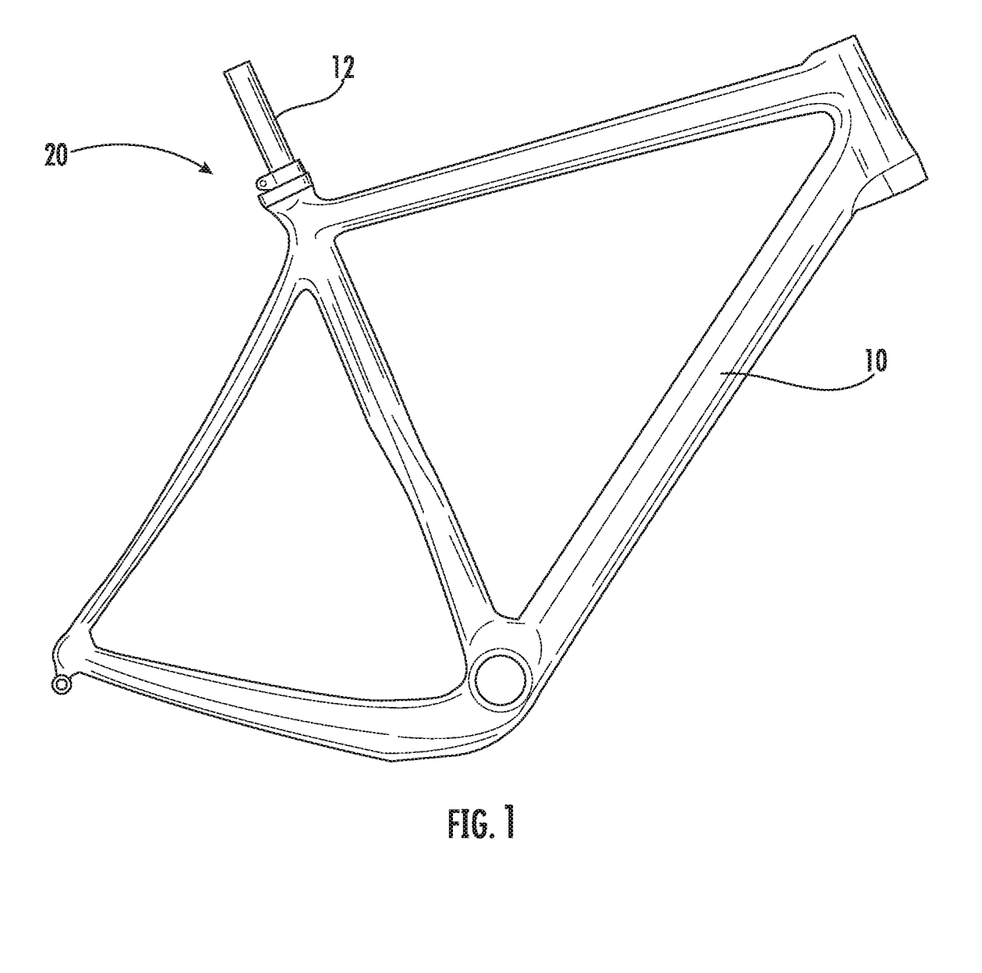
FIG. 1 is a side view of a typical bicycle frame having a seat post mounted with a bicycle seat post isolator in accordance with the present invention.
Figure 2:
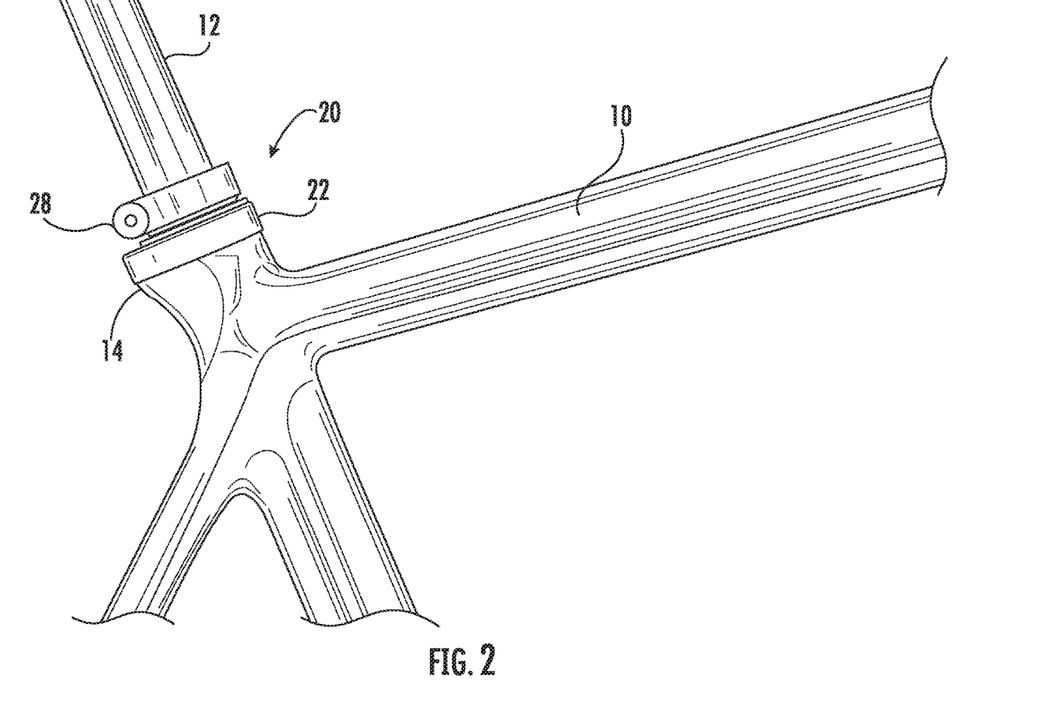
FIG. 2 is an enlarged partial view of the assembled seat post and the bicycle seat post isolator.
Figure 3:
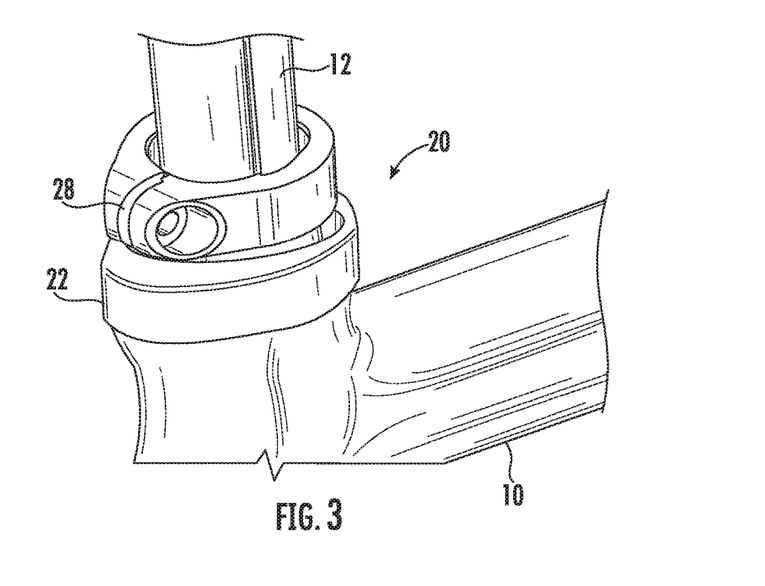
FIG. 3 is a further enlarged perspective view of the bicycle seat post isolator assembly at the frame opening.

Turning to the drawings and specifically to FIGS. 1-3, a bicycle frame 10 is illustrated with a seat post 12 engaged in an opening 14 (see FIG. 4) by means of a bicycle seat post isolator 20 in accordance with the present invention. Only the basic portions of frame 10 are illustrated since the various components (e.g. wheels handlebars, seat, etc.) are not part of the present invention. Also, in this specific example, seat post 12 and opening 14 have a generally tear-drop shaped cross-section to prevent rotation of seat post 14 but virtually any shape (e.g. round, oblong, irregular, etc.) could be used.

Figure 4:
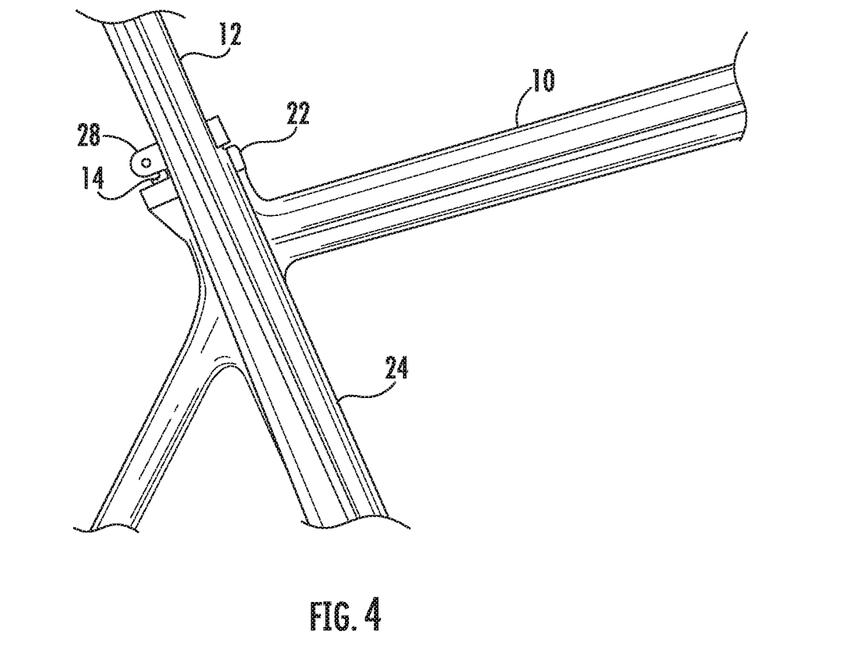
FIG. 4 is a sectional view of the bicycle seat post isolator installed in the bicycle frame in accordance with the present invention.
Figure 6:
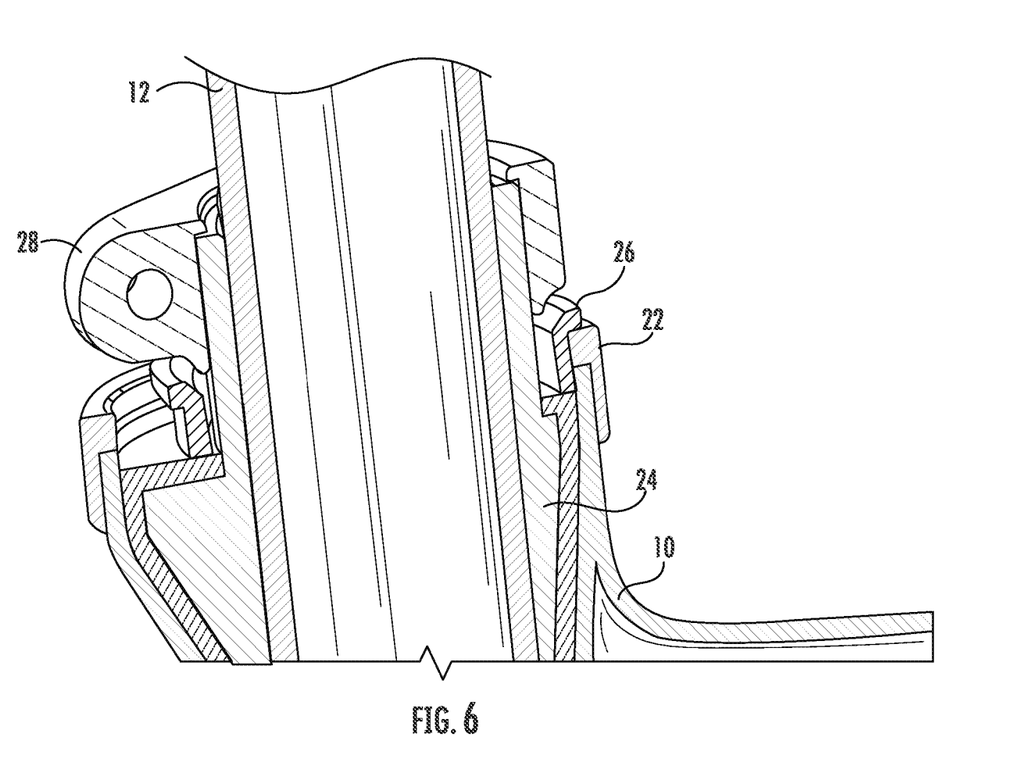
FIG. 6 is a sectional view of the bicycle seat post isolator assembly illustrating the internal relationship of the various components.
Figure 7A:
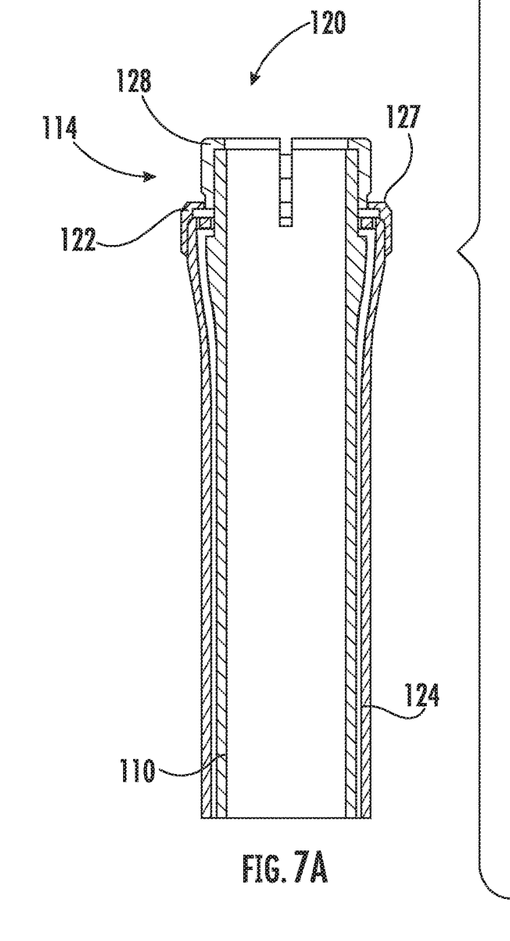
FIG. 7A is a sectional view of another example of a retaining structure in accordance with the present invention.
Figure 7B:
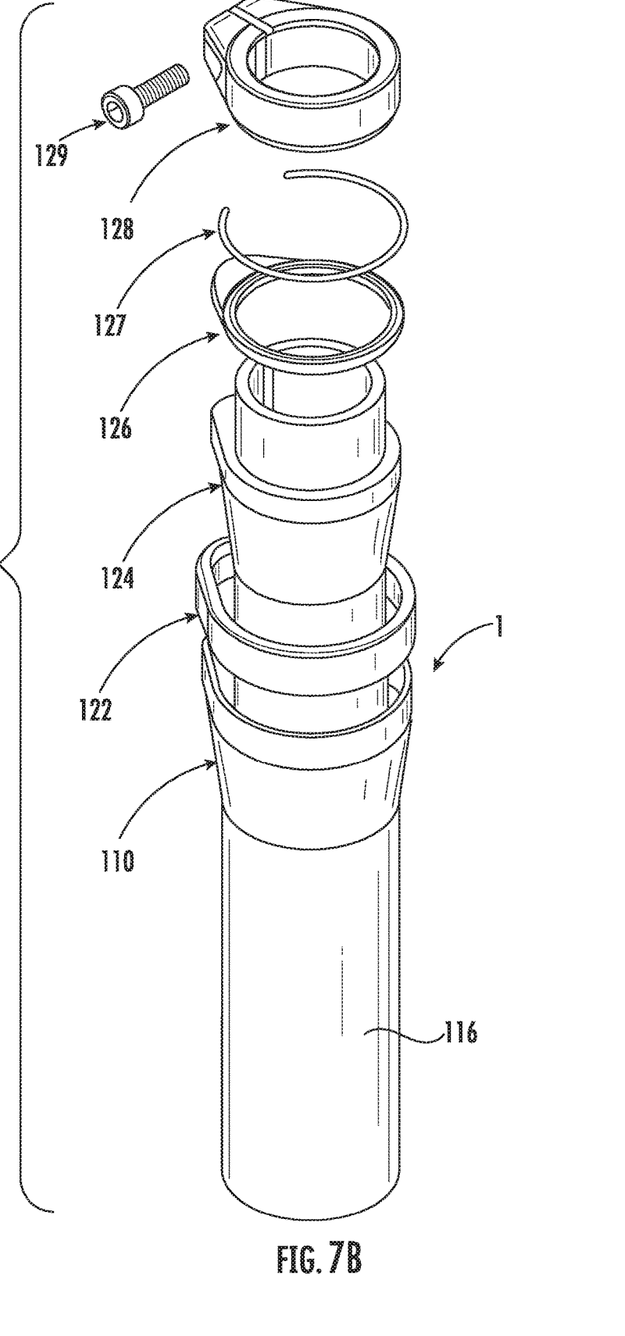
FIG. 7B is an exploded view of the retaining structure illustrated in FIG. 7A.
Figures 8A, 8B:
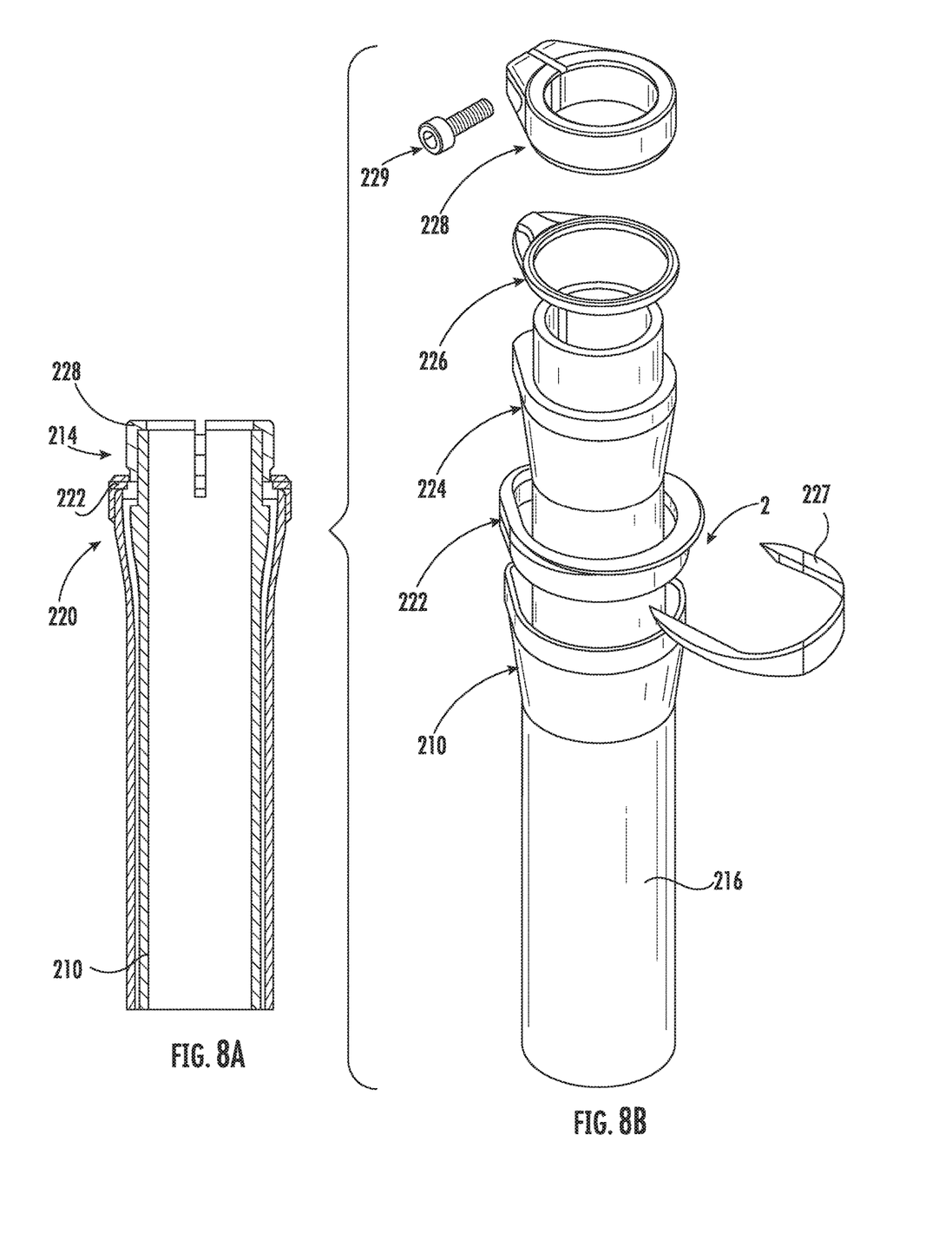
FIG. 8A is a sectional view of another example of a retaining structure in accordance with the present invention.
FIG. 8B is an exploded view of the retaining structure illustrated in FIG. 8A.

Referring additionally to FIGS. 4 and 6, it can be seen that bicycle seat post isolator 20 includes a retaining structure, which in this embodiment is an internally threaded frame cap or collar 22 affixed to the upper edge of opening 14, an elongated tubular seat post gripper 24, a locking ring 26 threadedly engaged in frame cap 22, and a clamp 28. It will be understood that the specific shape and size of these components is selected because of the cross-sectional shape of seat post 12 and opening 14 and the shapes and sizes will change to accommodate different structures. However, the specific function described will remain the same. In the preferred embodiment, frame cap 22 and locking ring 26 are separate components for ease in manufacturing and installation but it should be understood that they could be fabricated as a single cap and lock component in specific applications. The single cap and lock component could be formed with a shape substantially similar to the combination of frame cap 22 and locking ring 26 and would perform the functions of frame cap 22 and locking ring 26, as described below. In this disclosure either the frame cap 22 and locking ring 26, the single cap and lock component, or other configurations designed to perform the functions of the frame cap 22 and locking ring 26, are referred to generically as a "retaining structure". Two additional examples of retaining structure are illustrated in FIGS. 7 and 8 and described below.

Referring additionally to FIG. 6, internally threaded frame cap 22 is illustrated in cross-section. Frame cap 22 is fitted over the edge of opening 14 so that an outer portion extends downwardly a short distance over the outer surface of opening 14 and an inner peripheral surface is threaded. So that bicycle seat post isolator 20 may be easily installed or replaced, frame cap 22 is preferably frictionally engaged over the edge of opening 14 but may be attached by other means such as adhesive, etc.

Figure 5:
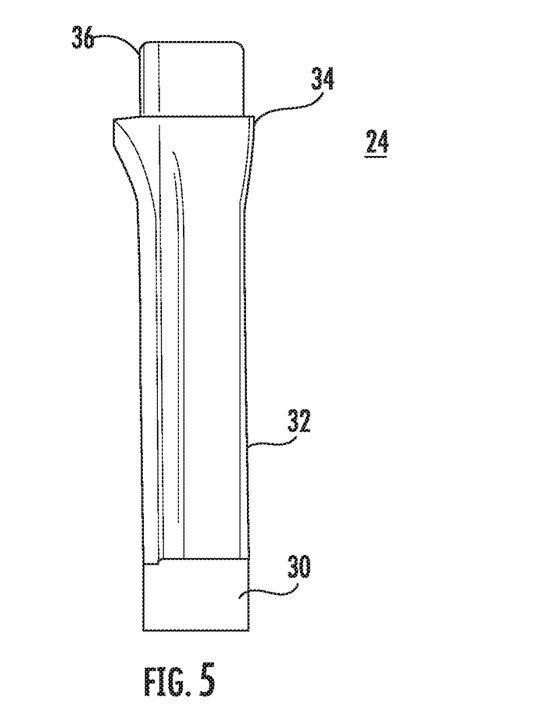
FIG. 5 is a side view of an internal component of the bicycle seat post isolator in accordance with the present invention.

Referring additionally to FIG. 5, seat post gripper 24 is illustrated in more detail. In this specific example, gripper 24 is fabricated with a plastic inner tubular body 30 having an outer layer/covering 32 of elastomeric material co-molded over the outer peripheral surface. While inner tubular body 30 is preferably plastic for simplicity in fabrication, it could be fabricated from some other material, such as tubular metal (e.g. aluminum, steel, etc.) Preferably, the layer/covering 32 of elastomeric material is rubber but some plastic or other material might be used in specific applications. Gripper 24 is formed to extend into opening 14 in frame 10 preferably a distance equal to a portion (e.g. three inches to ten inches) of the inserted length of seat post 12 so that gripper 24 and seat post 12 are completely isolated from frame 10 by layer/covering 32.

In the preferred embodiment gripper 24 is formed with a radially outwardly extending stop 34 spaced downwardly from an upper end 36 thereof. Stop 34 is formed from a combination of an outwardly projecting portion of inner tubular body 30 which is covered by layer/covering 32. In this example, a portion of the layer/covering 32 of stop 34 engages an inner surface of frame 10 so as to limit the length of gripper 24 that can be inserted into opening 14 of frame 10. With frame cap 22 fixedly in place, gripper 24 is inserted into opening 14 and locking ring 26 is threadedly engaged in frame cap 22. When locking ring 26 is fully threaded into frame cap 22, the lower edge engages stop 34 locking gripper 24 in place. Locking ring 26 when installed only engages an upper portion of layer/covering 32 covering stop 34 of gripper 24, as can be seen in FIG. 6. No portion of inner tubular body 30 of gripper 24 engages or touches bicycle frame 10.

Gripper 24 is designed so that a portion of plastic inner tubular body 30 extends above locking ring 26. Clamp 28 is positioned over the upper end of gripper 24. Seat post 12 can then be coaxially inserted into gripper 24, adjusted to the desired height, and clamp 28 can be tightened to firmly hold seat post 12 in the desired position. It should be noted that no portion of seat post 12 or plastic inner tubular body 30 of gripper 24 are in contact with any portion of frame 10. Thus, seat post 12 (and any seat attached thereto) is completely isolated from frame 10. All, or substantially all, vibrations are absorbed by layer/covering 32 and are not transmitted to seat post 12.

Referring to FIGS. 7A and 7B, another example of a retaining structure 120 in combination with an opening 114 in a bicycle frame (seat tube) 110 is illustrated. In this example, mechanism 120 includes a frame cap or collar 122 affixed or bonded to the upper edge of opening 114, an elongated tubular seat post gripper 124, a compression cap 126, a wire retention clip 127 and a seat post clamp 128. The structure is assembled by bonding frame cap or collar 122 to the top or upper edge of opening 114. Elongated tubular seat post gripper 124 is inserted into bicycle frame (seat tube) 110 through opening 114. Compression cap 126 is installed over gripper 124. Wire retention clip 127 is installed by pinching the clip closed and inserting it underneath frame cap or collar 122. Once wire retention clip 127 is released, it will expand in place under frame cap or collar 122 and contact an angled face on the upper surface of compression cap 126 and an angled surface underneath frame cap or collar 122. By contacting both angled faces, wire retention clip 127 causes compression cap 126 to apply a downward force, holding gripper 124 in place. Seat post clamp 128 is installed over the upper end of gripper 124. Once the seat post is installed, it is held in place by tightening seat post clamp 128 with bolt 129.

Referring to FIGS. 8A and 8B, still another example of a retaining structure 220 in combination with an opening 214 in a bicycle frame (seat tube) 210 is illustrated. In this example, mechanism 220 includes a frame cap or collar 222 affixed or bonded to the upper edge of opening 214, an elongated tubular seat post gripper 224, a compression cap 226, a C-clip 227 and a seat post clamp 228. The structure is assembled by bonding frame cap or collar 222 to the top or upper edge of opening 214. Elongated tubular seat post gripper 224 is inserted into bicycle frame (seat tube) 210 through opening 214. Compression cap 226 is installed over gripper 124. C-clip 127 is installed from the front such that the wings of C-clip 127 contact a top face of compression cap 226 and the face underneath the slots on the sides of the frame cap or collar 222. By contacting both of the faces, C-clip 227 causes compression cap 226 to apply a downward force, holding gripper 124 in place. C-clip 227 has circular reliefs on the wings which mate with an extruded ring on the top of compression cap 226 so that C-clip 227 cannot accidentally slide out of place. Seat post clamp 228 is installed over the upper end of gripper 224. Once the seat post is installed, it is held in place by tightening seat post clamp 228 with bolt 229.

Figure 9:
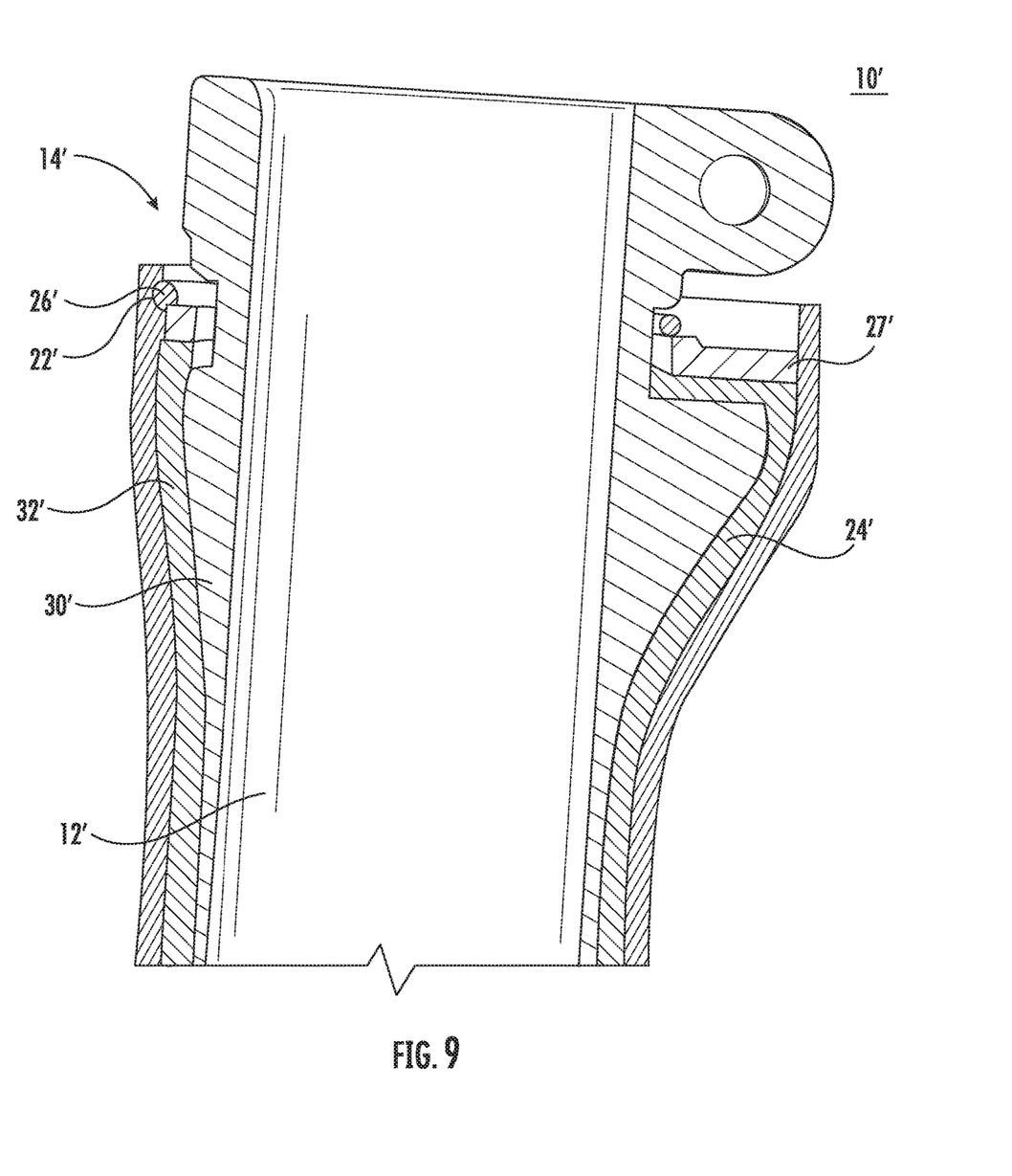
FIG. 9 is an enlarged sectional view of another example of a retaining structure in accordance with the present invention.

Referring now to FIG. 9, a modified bicycle seat post isolator 20' includes a modified retaining structure, which in this embodiment includes a groove 22' formed in the internal surface adjacent the upper edge of opening 14', an elongated tubular seat post gripper 24', a locking ring 26' inserted into groove 22', and a clamp 28'. Also, in this embodiment, gripper 24' is fabricated with a plastic inner tubular body 30' having an outer layer/covering 32' of elastomeric material co-molded over the outer peripheral surface. While inner tubular body 30' is preferably plastic for simplicity in fabrication, it could be fabricated from some other material, such as tubular metal (e.g. aluminum, steel, etc.) Preferably, the layer/covering 32' of elastomeric material is rubber but some plastic or other material might be used in specific applications. As can be seen in FIG. 9, layer/covering 32' extends over the upper edges of tubular body 30' and a ring 27' is inserted into opening 14' over the upper surface of layer/covering 32' to cooperate with locking ring 26' and lock the assembly firmly in opening 14' of frame 10'.

It will be understood that the specific shape and size of these components is selected because of the cross-sectional shape of seat post 12' and opening 14' and the shapes and sizes will change to accommodate different structures. However, the specific function described will remain the same. In the preferred embodiment, locking ring 26' and ring 27' are separate components for ease in manufacturing and installation but it should be understood that they could be fabricated as a single retaining structure in specific applications. The single retaining structure could be formed with a shape substantially similar to the combination of locking ring 26' and ring 27' and would perform the functions of locking ring 26' and ring 27', as described below. In this disclosure either the frame cap 22 and locking ring 26, the locking ring 26' and ring 27', the single retaining structure, or other configurations designed to perform the functions of the retaining structure, are referred to generically as a "retaining structure".

Figure 10:
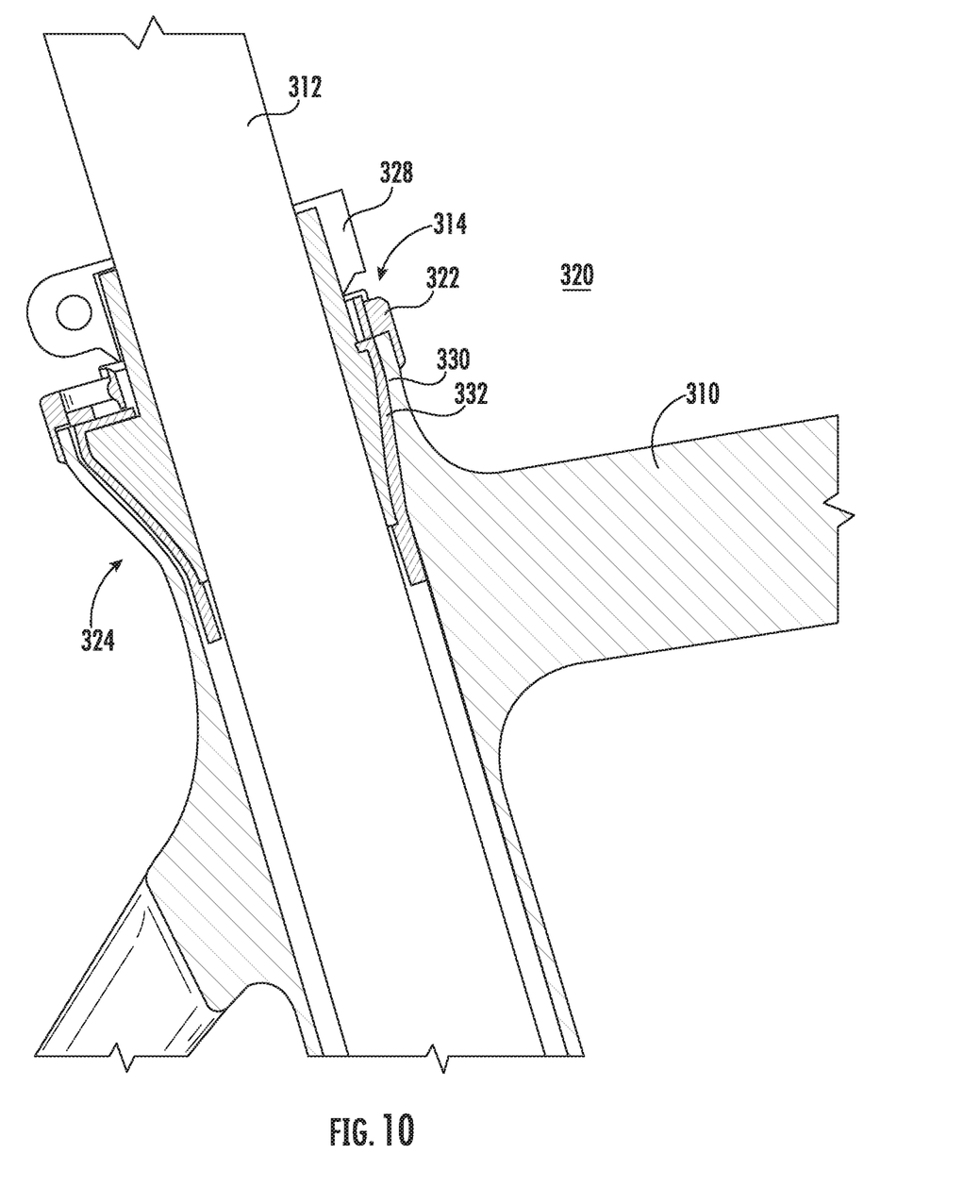
FIG. 10 is an enlarged sectional view of another example of a bicycle seat post isolator in a bicycle seat post isolator assembly in accordance with the present invention.

Turning to FIG. 10, another example of a bicycle seat post isolator assembly 320 in accordance with the present invention is illustrated. In this specific example, a shorter gripper 324 is fabricated with a shorter plastic inner tubular body 330 having an outer layer/covering 332 of elastomeric material co-molded over the outer peripheral surface. While inner tubular body 330 is preferably plastic for simplicity in fabrication, it could be fabricated from some other material, such as tubular metal (e.g. aluminum, steel, etc.) Preferably, the layer/covering 332 of elastomeric material is rubber but some plastic or other material might be used in specific applications. Gripper 324 is formed to extend into opening 14 in frame 10 preferably a shorter distance than gripper 24 illustrated in FIG. 5. One reason for reducing the length of either tubular body 330 or outer layer/covering 332, or both, is to increase the amount of flex in the isolator. In any case gripper 324 and seat post 312 are completely isolated from frame 310 by layer/covering 332.

Thus, the present invention discloses and provides a new and improved bicycle seat post isolator. The bicycle seat post isolator completely isolates the seat post (and attached seat) from the bicycle frame. Further, the bicycle seat post isolator is relatively simple to manufacture and install. Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A bicycle seat post isolator assembly constructed to be fixedly engaged in a seat post receiving opening in a bicycle frame, the assembly comprising:
a seat post gripper including an elongated inner tubular body with an outer elastomeric layer/covering, the seat post gripper designed to be inserted into the seat post receiving opening and to receive a seat post coaxially therein, an upper portion of the inner tubular body extending outwardly from the seat post receiving opening, the outer elastomeric layer/covering being positioned between the inner tubular body and the bicycle frame;
a retaining structure designed to be fixed adjacent an edge of the seat post receiving opening to only engage portions of the outer elastomeric layer/covering of the seat post gripper so as to lock the seat post gripper in the seat post receiving opening; and
a clamp positioned to fix the upper portion of the inner tubular body to a seat post inserted coaxially into the seat post gripper, whereby the outer elastomeric layer/covering of the seat post gripper is positioned between the inner tubular body of the seat post gripper with the seat post inserted coaxially into the seat post gripper and the bicycle frame.

2. The bicycle seat post isolator assembly as claimed in claim 1 wherein the retaining structure is designed to be fixed over an edge of the seat post receiving opening to only engage portions of the outer elastomeric layer/covering of the seat post gripper so as to lock the seat post gripper in the seat post receiving opening.

3. The bicycle seat post isolator assembly as claimed in claim 1 wherein the retaining structure includes a groove formed in the inner surface of the seat post receiving opening and a locking ring and ring combination extending into the opening and the groove to only engage portions of the outer elastomeric layer/covering of the seat post gripper so as to lock the seat post gripper in the seat post receiving opening.

4. The bicycle seat post isolator assembly as claimed in claim 1 wherein the retaining structure includes a frame cap designed to be fixed over an edge of the seat post receiving opening and a locking ring constructed to be engaged with the frame cap and to engage only portions of the outer elastomeric layer/covering of the seat post gripper so as to lock the seat post gripper in the seat post receiving opening.

5. The bicycle seat post isolator assembly as claimed in claim 4 wherein the frame cap includes an inner portion having inner peripheral threads and the locking ring is constructed to be threadedly engaged with the frame cap.

6. The bicycle seat post isolator assembly as claimed in claim 1 wherein the seat post gripper includes a stop positioned to limit insertion of the seat post gripper into the seat post receiving opening.

7. The bicycle seat post isolator assembly as claimed in claim 1 wherein the elongated inner tubular body is molded plastic.

8. The bicycle seat post isolator assembly as claimed in claim 7 wherein the elastomeric layer/covering is rubber co-molded to the plastic inner tubular body.

9. The bicycle seat post isolator assembly as claimed in claim 1 wherein the seat post gripper is formed to extend into the seat post receiving opening a distance equal to a portion of the inserted length of the seat post so that the seat post gripper and the seat post are completely isolated from the frame by the elastomeric layer/covering.

10. The bicycle seat post isolator assembly as claimed in claim 9 wherein the seat post gripper and/or the elastomeric layer/covering is formed to extend into the seat post receiving opening a distance providing maximum flex.

11. A bicycle seat post isolator assembly comprising:
a frame cap designed to be fixed over an edge of the seat post receiving opening;
a seat post gripper including an elongated inner tubular body with an outer elastomeric layer/covering, the seat post gripper designed to be inserted into a seat post receiving opening in a bicycle frame and to receive the seat post coaxially therein, an upper portion of the inner tubular body extending outwardly from the seat post receiving opening, the outer elastomeric layer/covering being positioned between the inner tubular body and the bicycle frame;
a locking ring constructed to be engaged with the frame cap and to engage only portions of the outer elastomeric layer/covering of the seat post gripper so as to lock the seat post gripper in the seat post receiving opening; and
a clamp positioned to fix the upper portion of the inner tubular body to the seat post inserted coaxially into the seat post gripper, whereby the outer elastomeric layer/covering of the seat post gripper is positioned between the inner tubular body of the seat post gripper with the seat post inserted coaxially into the seat post gripper and the bicycle frame.

12. The bicycle seat post isolator assembly as claimed in claim 11 wherein the frame cap includes an inner portion having inner peripheral threads and the locking ring is constructed to be threadedly engaged with the frame cap.

13. The bicycle frame with seat post isolator assembly as claimed in claim 11 wherein the seat post gripper includes a stop positioned to limit insertion of the seat post gripper into the seat post receiving opening.

14. The bicycle frame with seat post isolator assembly as claimed in claim 11 wherein the elongated inner tubular body is molded plastic.

15. The bicycle frame with seat post isolator assembly as claimed in claim 14 wherein the elastomeric layer/covering is rubber co-molded to the plastic inner tubular body.

16. The bicycle frame with seat post isolator assembly as claimed in claim 11 wherein the seat post gripper is formed to extend into the seat post receiving opening a distance equal to a portion of the inserted length of the seat post so that the seat post gripper and the seat post are completely isolated from the frame by the elastomeric layer/covering.

17. The bicycle frame with seat post isolator assembly as claimed in claim 16 wherein the seat post gripper and/or the elastomeric layer/covering is formed to extend into the seat post receiving opening a distance providing maximum flex.

18. The bicycle seat post isolator assembly as claimed in claim 16 wherein the frame cap includes an inner portion having inner peripheral threads and the locking ring is constructed to be threadedly engaged with the frame cap.

19. A bicycle frame with seat post isolator assembly comprising:
a bicycle frame including a seat post receiving opening;
a seat post;
a frame cap designed to be fixed over an edge of the seat post receiving opening;
a seat post gripper including an elongated inner tubular body with an outer elastomeric layer/covering, the seat post gripper designed to be inserted into the seat post receiving opening and to receive the seat post coaxially therein, an upper portion of the inner tubular body extending outwardly from the seat post receiving opening, the outer elastomeric layer/covering being positioned between the inner tubular body and the bicycle frame;
a locking ring constructed to be engaged with the frame cap and to engage only portions of the outer elastomeric layer/covering of the seat post gripper so as to lock the seat post gripper in the seat post receiving opening; and
a clamp positioned to fix the upper portion of the inner tubular body to the seat post inserted coaxially into the seat post gripper, whereby the outer elastomeric layer/covering of the seat post gripper is positioned between the inner tubular body of the seat post gripper with the seat post inserted coaxially into the seat post gripper and the bicycle frame.

* * * * *